Oct. 16, 1962     W. A. PLUMMER ET AL     3,058,867
CABLING MACHINE AND METHOD OF PRODUCING JACKETED CABLE
Filed Nov. 2, 1959     6 Sheets-Sheet 1

WALTER A. PLUMMER,
RICHARD A. SPERR,
INVENTORS.

BY
ATTORNEY

FIG. 2.

WALTER A. PLUMMER,
RICHARD A. SPERR,
INVENTORS.

BY
ATTORNEY

Oct. 16, 1962   W. A. PLUMMER ET AL   3,058,867
CABLING MACHINE AND METHOD OF PRODUCING JACKETED CABLE
Filed Nov. 2, 1959   6 Sheets-Sheet 3

WALTER A. PLUMMER,
RICHARD A. SPERR,
INVENTORS.

BY
ATTORNEY

Oct. 16, 1962 W. A. PLUMMER ET AL 3,058,867
CABLING MACHINE AND METHOD OF PRODUCING JACKETED CABLE
Filed Nov. 2, 1959 6 Sheets-Sheet 5

WALTER A. PLUMMER,
RICHARD A. SPERR,
INVENTORS.

BY
ATTORNEY

United States Patent Office 3,058,867
Patented Oct. 16, 1962

3,058,867
CABLING MACHINE AND METHOD OF
PRODUCING JACKETED CABLE
Walter A. Plummer, Sherman Oaks, and Richard A. Sperr, Whittier, Calif.; said Sperr assignor to said Plummer
Filed Nov. 2, 1959, Ser. No. 850,127
40 Claims. (Cl. 156—52)

This invention relates to the manufacture of multiple conductor cable and more particularly to automatic apparatus for continuously assembling multiple conductor cabling having a thin-walled seamed jacket permanently sealed thereabout.

There have been many prior proposals for the manufacture of multiple conductor cables provided with protective sheathing of both a metallic and a non-metallic character. Equipment heretofore proposed for this purpose, however, is subject to many disadvantages owing to the large amount of space required for the cable manufacturing equipment, the complexity of the equipment, and particularly of that employed in the sheathing operation. The latter operation has required very heavy duty expensive equipment for vulcanizing, molding or braiding sheathing jackets about the assembled conductors.

There has been an increasing demand for a universal cable assembly process and apparatus which is adaptable to the construction of cables of widely different characters and sizes using a minimum of labor and equally suitable for making both long and relatively short lengths of cabling.

By prior cable assembling techniques it is not possible or feasible to sheath the assembled conductors after the opposite ends of the conductors have been connected to terminals and checked for accuracy.

These and other needs are fulfilled to an unusually satisfactory degree by the present invention requiring not in excess of 25 x 75 feet of floor space and capable of producing multiple conductor cables of a wide range of sizes and lengths in a continuous procedure and including a permanently assembled fluid-tight protective sheath. Essentially the equipment comprises a conductor-laying, cable-forming device; a main power unit; a jacket or sheath applying station; and a finished cable take-up device. When these principal units are arranged in alignment they are cooperable to produce a multiple-conductor, multiple-layer, spirally-wound cable. This cable product is enclosed in a thin, flexible, walled sheath having a longitudinal seam which is progressively closed as the cable advances. Included is means for applying a sealant to the seam where desirable to avoid the possibility of the seam opening in the handling or use of the finished product. Preferably, and by way of example, previously prepared sheathing is advanced from a supply reel which sheathing includes along its opposite edges integral slide fastener tapes having continuous complementally shaped interlocking elements. A feature of the invention is the provision of a specially constructed automatic device for continuously closing the sheathing about the cable and pressing the interlocking portions of the seam-forming edges together. Larger size cables are preferably formed in stages, all except the final assembly stage of the conductors being carried out without the jacket assembling equipment, it being understood that the latter is employed only when applying the final layers of conductors. If desired, the planetary assembly used in forming the cable proper may be operated independently of the jacketing assembly.

Another feature for the arrangement is the provision of automatic means for discontinuing all phases of the assembly operation simultaneously in response to an abnormal operating condition in the seam closing equipment or as a predetermined length of jacketed cabling is produced. By reason of these control features, the entire operation is capable of being carried out substantially automatically and without other than casual supervision.

Another feature of the present invention is the use of a plastic sheath which takes a permanent shrunk set upon being heated. This characteristic of the jacket facilitates the assembly of the sheathing about the cable and the closing of the seam following which the sheath is shrunk into snug taut condition about the cable as is most desirable for long service life, appearance and other reasons.

Accordingly, it is a primary object of the present invention to provide unique apparatus and an improved method for continuously forming an electrical cable and of enclosing the same in fluid-tight sheathing.

Another object of the invention is the provision of a method and apparatus for progressively assembling seamed sheathing about a group of conductors.

Another object of the invention is the provision of a method and apparatus for shrinking a flexible plastic sheath about a group of assembled conductors.

Another object of the invention is the progressive and automatic assembly of initially loose fitting sheathing about a group of conductors and including the subsequent shrinkage of the sealed sheath into snug fitting relation to the tightly assembled conductors.

Another object is the provision of a cable assembling technique by which a plurality of conductors can be grouped, connected to terminals and checked for the accuracy of the connections to the cable head structures and thereafter snugly sheathed in a fluid-tight jacket.

Another object of the invention is the provision of automatic apparatus for forming a multiple conductor cable and of enclosing the same with a fluid-tight seamed sheath without need for hand labor and including means responsive to an abnormal operating condition to discontinue the assembly operation until the abnormal condition has been rectified.

Another object of the invention is the provision of a simple, compact, power-driven, cable-forming apparatus arranged to construct a multiple-layer, multiple-conductor cable and for applying a fluid-tight seamed jacket to the cable while the same is being advanced to a take-up reel.

Another object of the invention is the provision of multiple-station, cable-forming machine having a suitable control station at which the several driving motors can be easily and positively controlled by an operator.

Another object of the invention is apparatus for applying continuous plastic sheathing to a cable or the like without need for hand labor and including means for enclosing the complementally shaped interlocking lateral edges of the sheath and for sealing the same permanently assembly by a sealing agent automatically and uniformly applied to the interfitting parts immediately prior to their engagement.

Another object of the invention is the provision of a machine specially designed for holding the complementally-shaped interlocking edges of plastic slide fastener tapes firmly in position and for pressing the same accurately and precisely into assembled relation while these edges are being advanced through the device and along the face of a finger-like anvil.

Another object of the invention is the provision of a commercial closure device for use with slide-fastener-equipped sheathing and including capillary-controlled means for dispensing a sealing agent between the interfitting faces of the seam immediately prior to the pressing of these surfaces together.

These and other more specific objects will appear upon reading the following specification and claims and upon considering in connection therewith the attached drawings to which they relate.

Referring now to the drawings in which a preferred embodiment of the invention is illustrated:

FIGURE 14 is a front elevational view of the conductor supporting turntable employed to apply layers of conductors to the cable and to wind them spirally thereabout as the cable is advanced.

Figures 1, 1A:
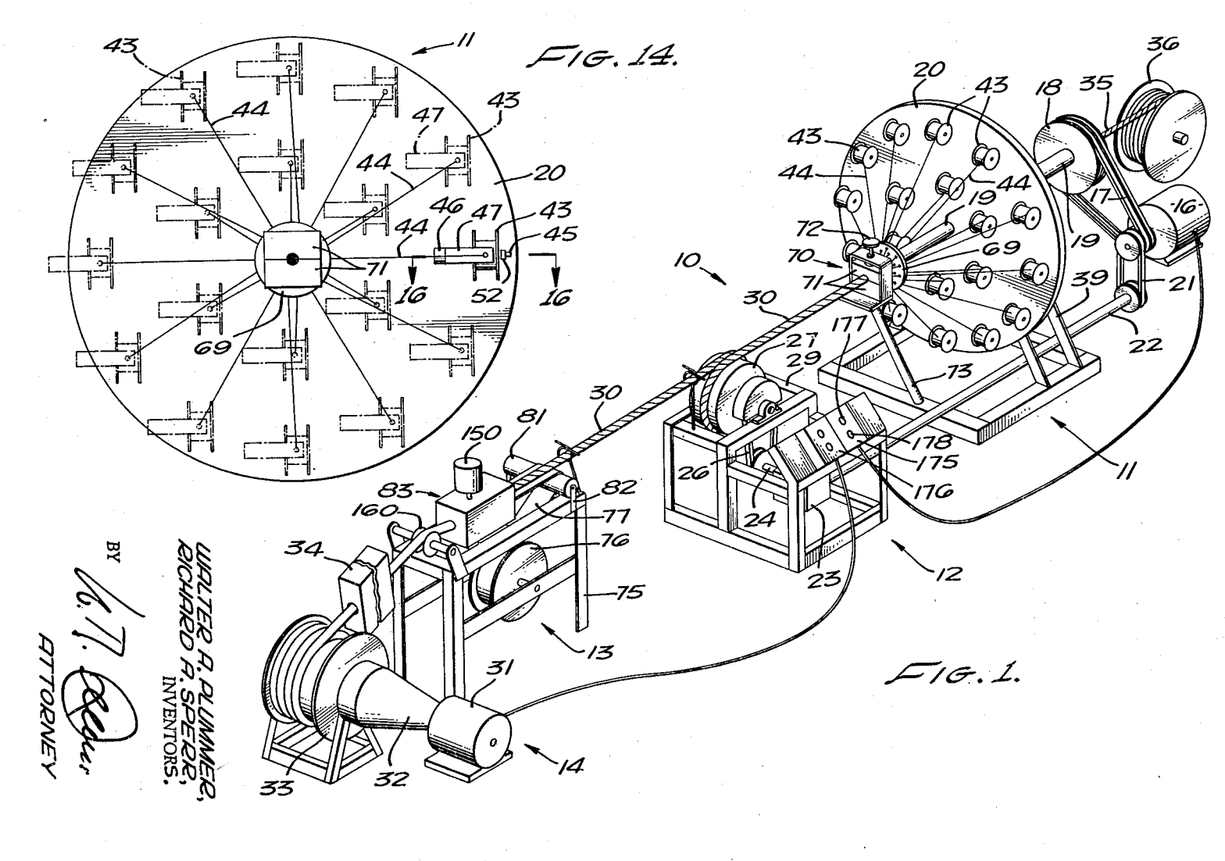
FIGURE 1 is a general perspective view of the apparatus embodying the present invention.

Referring more particularly to FIGURE 1, the continuous automatic cable making equipment designated generally 10 will be understood to comprise a planetary or cable forming assembly 11, a control station 12, a cable sheathing assembly 13, and a cable take-up unit 14. These various major assemblies are mounted in general alignment with one another on a common supporting floor. Cable forming assembly 11 is driven by a motor 16 through belting 17 and a pulley 18, the latter being secured to a main supporting shaft 19 fixed to a vertically disposed turntable 20. Shaft 19 is hollow and is supported in suitable antifriction bearings 38 (FIGURE 17) mounted on a rigid pedestal 39.

Motor 16 is also coupled by belt 21 to a pulley carried by a long shaft 22 supported in suitable bearings not shown and having a driving connection with gearing 23 of the control station assembly designated generally 12. This assembly includes a driven shaft 24 coupled by belt 26 to drive a cable pulling capstan 27 rotatably supported on a horizontally disposed shaft of control assembly frame 29. It is pointed out that capstan 27 has a wide high-friction surface about which cable 30 under construction is wrapped for the purpose of applying tension to rearward portions of the cable to advance the same past assembly station 11. Assisting capstan 27 in maintaining the cable under tension and in coiling the finished cable product on a storage reel is a second motor 31 driving a belt enclosed within a casing 32 and arranged to rotate take-up reel 33 for cable 30, the cable emerging from the heat shrinking oven 34.

Referring now more particularly to FIGURES 1, and 14 to 18, cable forming assembly 11 will be described. Larger diameter cables are usually constructed about a core here shown as a small diameter bundle of twisted conductors 35 coiled on a supply reel 36. It will be understood that supply reel 36 may be supported in any suitable manner and including a drag brake effective to maintain core 35 under tension while being dispensed from the reel. Core 35 passes through the hollow supporting shaft 19 supporting turntable 20. The latter is secured to shaft 19, as by bolts 40 (FIGURE 17) and a flanged bushing 41. Arranged in suitable spaced relation on the forward face of turntable 20 are concentric rings of supply reels 43 of conductors 44 used in forming cable 30. Turntables of this general type are known to the prior art and are so arranged as to maintain the supporting stub shafts for each reel parallel to one another despite the rotation of the supporting turntable 20. The manner in which this is accomplished in the present turntable will be described by the aid of FIGURES 15 to 17.

Figures 15, 16, 18:
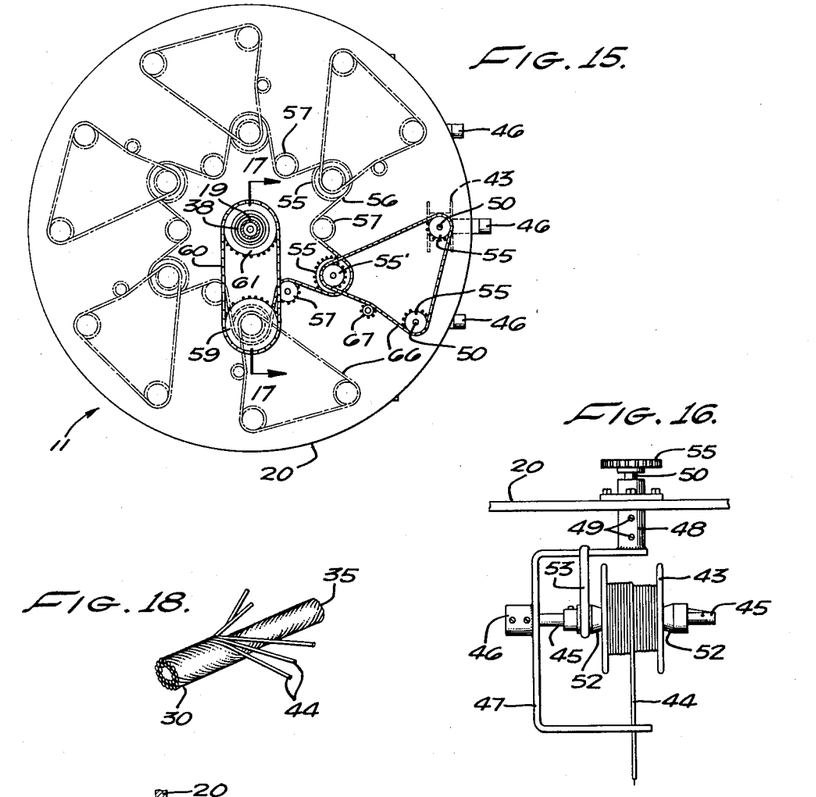
FIGURE 15 is a similar view taken from the rear face of the conductor supporting turntable and showing the drive sprockets for maintaining the conductor reels constantly in the same relative positions despite the rotation of the turntable.
FIGURE 16 is a fragmentary detailed view on an enlarged scale taken generally along line 16—16 on FIGURE 14 and showing details of the conductor reel support.
FIGURE 18 is a fragmentary sectional view of the cable indicating that adjacent layers of conductors are wrapped spirally in opposite directions.

Referring first to FIGURE 16, it is pointed out that each conductor supply reel 43 is mounted on a stub shaft 45 having one end fixed to a socket 46 rigid with a U-shaped bracket 47. One leg of bracket 47 is welded or otherwise secured to a socket 48 clamped as by set screws 49 to a shaft 50 rotatably supported by and projecting through an opening in turntable 20. Supply reel 43 is prevented from unwinding except by the application of a predetermined pull on the stored conductor by means of a pair of cooperating cone members 52, 52 slidably but non-rotatably mounted on stub shaft 45 with the cone portions thereof extending into the central opening through reel 43. Desirably, a heavy rubber band 53 embraces one of the cones and one leg of bracket 47 in order to snub the reel and impose tension on the conductors. It is pointed out that each of supply reels 43 is supported on a similar bracket assembly to that just described, there being as many of these supporting brackets and supply reels of conductors as are required to construct a cable with the desired number of conductors.

As is made clear by FIGURES 1 and 15, the turntable here illustrated has two concentric rings of conductor dispensing reels 43. Importantly, the supporting shafts 50 for each supporting bracket 47 is arranged to be rotated one revolution within its supporting journal for each complete revolution of turntable 20. Equally important is the fact that the rotation of shaft 50 is opposite to the rotation of turntable 20 with the result that shaft 45 for each supply reel 43 remains continuously in the same angular position relative to the horizontal irrespective of the rotary position of turntable 20. In this manner assurance is provided that the conductors can be spirally assembled about core 35 without twisting the individual conductors in any degree about their own axes.

Figure 17:
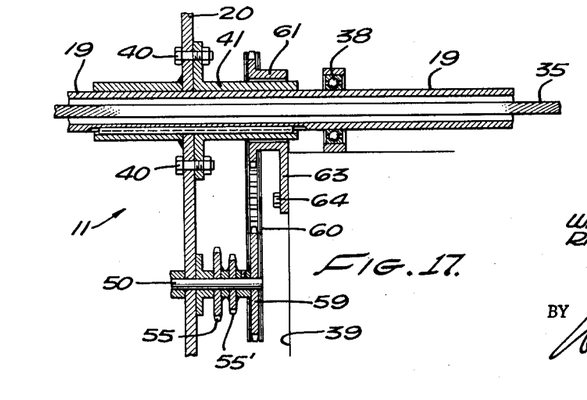
FIGURE 17 is a fragmentary cross-sectional view of a portion of the reel drive mechanism taken along line 17—17 on FIGURE 15.

FIGURES 15 and 17 show the manner in which this is accomplished. Thus, fixed to the end of each shaft 50 is a sprocket 55 seating or meshing with a roller chain. The inner circle of reels 43 have their sprockets 55 in mesh with a roller chain 56 held suitably tensioned as by idlers 57 mounted on stub shafts carried by turntable 20. One of the stub shafts is longer than the others and has fixed to its outer end a sprocket 59 meshing with a roller chain 60 which in turn meshes with a stationary sprocket 61 encircling shaft 19 but held against rotation by a supporting arm 63 rigidly secured to frame 39, as by cap screws 64.

Owing to the anchorage of sprocket 61 against rotation, it will be evident that the rotation of turntable 20 is effective through roller chain 60 to rotate sprocket 59 one revolution for each complete revolution of turntable 20 while rotating shafts 50 oppositely to rotation of turntable 20. The rotation of the outer ring of conductor supporting brackets is assured by means of roller chains 66 which encircle a pair of sprockets 55 as well as an identical sprocket 55′ carried on shafts 50 for the inner circle of reel supporting brackets. Chains 66 may be maintained properly tensioned by adjustable idler sprockets 67 suitably mounted on the forward face of the turntable as is indicated in FIGURE 15.

The individual conductors 44 extend from the associated supply reels 43 through individual openings in a spider 69 carried on the foremost end of shaft 19. The openings in disc 69 are closely adjacent the surface of cable core 35 issuing from the forward end of shaft 19 and are pressed into firm spiralling contact with the cable by a suitable forming device 70 rigidly mounted on the upper end of a pedestal 73. Device 70 includes a pair of blocks 71, 71 held pressed against the opposite sides of the cable by an adjustable screw 72 passing through a threaded opening in a block supporting frame in the manner made clear by FIGURE 1.

Referring now more particularly to FIGURES 2 through 13, it is pointed out that sheath assembly station 13 comprises a suitable framework 75 supporting a supply reel 76 of flexible walled continuous sheathing 77 of plastic, elastomer or the like. Supply reel 77 is held against unwinding at an excessive rate by a brake such as a flexible friction band 78. One end of this band is anchored to frame 75 and the other end passes over an idler pulley 79 and supports a weight 80 effective to hold an intermediate portion of band 78 pressed against the coiled sheathing 77. In this manner sheathing 77 dispensed from reel 76 is maintained under a desired degree of lengthwise tensioning as it passes over a broad idler roller 81 supported by a bracket 82 from frame 75 and is then pressed against the underside of advancing cable 30 and into the sheath assembling device indicated generally at 83. As indicated above, the downward bowing of the center portion of the strip by cable 30 and eyebolt 168 greatly facilitates the wrapping of the sheath about the cable as it advances into closure device 95 as well as in the application of the appropriate tension on the seam portions 96, 96′ for the smooth trouble-free functioning of device 95.

Figure 2:
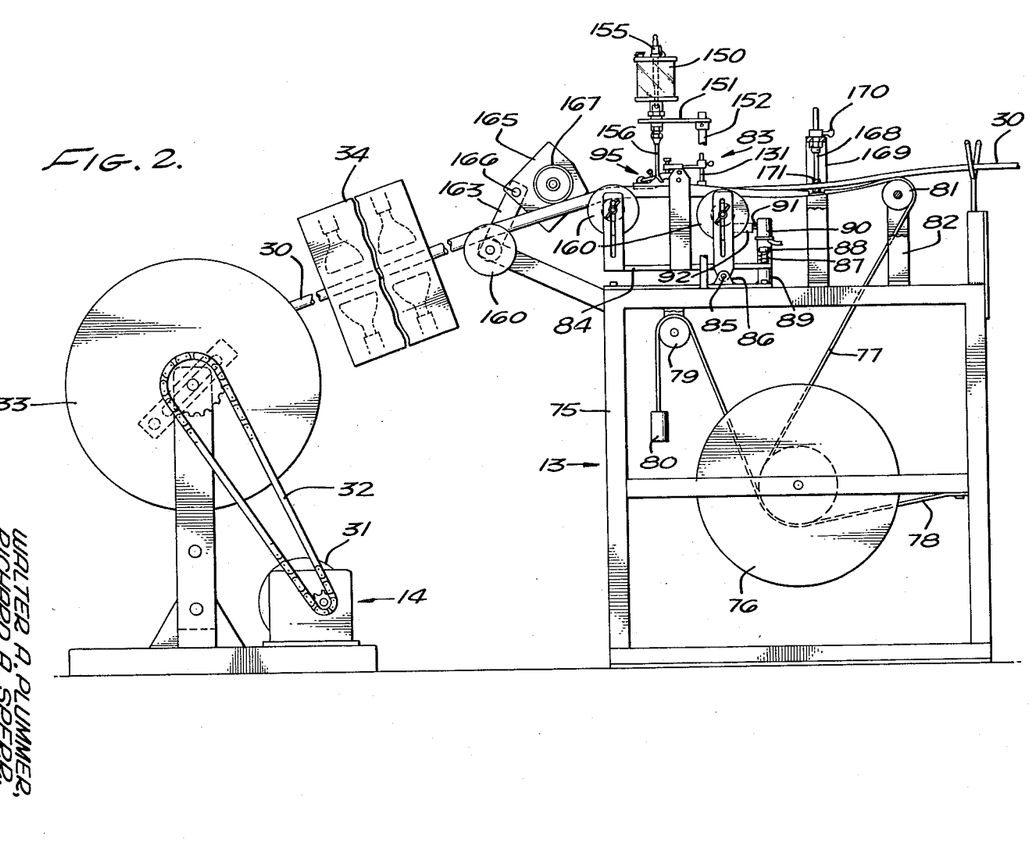
FIGURE 2 is a side elevational view on an enlarged scale of the sheath assembly station and of the cable take-up facility.

Sheath assembling unit 83 has a rigid main framework 84 pivotally supported on main frame 75 by a pivot pin 85 journaled in a bracket 86 secured to the top of frame 75 in the manner best shown in FIGURE 2. It will be understood that unit 83 is free to pivot to a limited extent about pivot pin 85 but is normally held against pivoting by a coil spring 87 surrounding an adjustable cap screw 88 having its lower end threaded into a boss 89 secured to the top of framework 75. Normally spring 87 holds unit 83 pivoted clockwise as viewed in FIGURE 2 against the top of boss 89. However, should there be slight excessive pull on sheathing 77 as the same is advanced toward take-up reel 33, it will be evident that spring 87 will be compressed as unit 83 pivots counterclockwise about pin 85.

The described counterclockwise pivoting of unit 83 about pin 85 frequently acts to relieve the abnormal condition causing such pivotal movement. When the slight permissible pivoting movement of unit 83 does not remedy the abnormality thereby indicating the presence of dangerous conditions for either the equipment, the cabling under construction, or both, the pivotal movement is utilized to de-activate the entire equipment. Thus, the present apparatus safeguards against such eventualities by utilizing the described pivoting movement to operate a safety cut-off switch 90 fixedly mounted on framework 75. Control button 91 of this switch is normally held in the open position of switch 90 by abutment with a boss 92 mounted on frame 84 of pivoting sheathing unit 83. Thus, whenever any condition exists in sheathing assembly 83 causing this unit to be pivoted beyond a predetermined arc inconsistent with safe operating conditions, switch 90 closes to activate suitable known circuit breaking equipment present in control station 12 and effective to de-energize both main motor 16 and driving motor 31 for cable take-up reel 33.

A particularly important feature of sheathing assembly 83 is the device designated generally 95 in FIGURES 2, 3, 4 and 5 and effective to effect the interlocking engagement of the two mating parts 96, 96′ of the sheath seam, these parts being formed along the opposite lateral edges of sheathing 77. As will be best understood by reference to FIGURE 6, sheathing 77 preferably is formed from thin flexible-walled plastic material, as for example polyvinyl chloride, and its opposite lateral edges are formed with seam parts 96, 96′ generally known as slide fastener tapes having complementally-shaped interfitting tongues and grooves of known construction.

Figures 7, 8, 9, 10, 11, 12, 13:
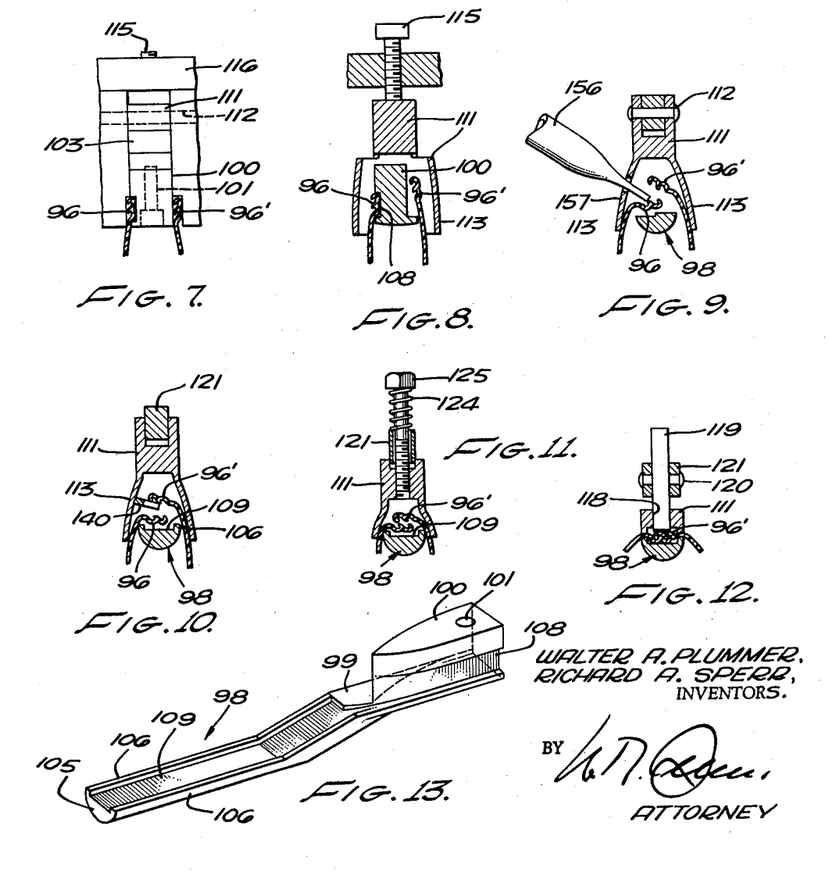
FIGURES 7 to 12, inclusive, are cross-sectional views taken on FIGURE 4 along lines 7—7, 8—8, 9—9, 10—10, 11—11, 12—12, respectively, and showing details of the seam closing device and the manner in which the complementally-shaped edges of the sheath are guided into fully assembled position as well as the manner in which the sealing agent is distributed between the contacting surfaces of the seam parts.
FIGURE 13 is a perspective view of the anvil component of the seam assembly device.

Seam closing device 95 includes an elongated fingerlike anvil 98 having the configuration best shown in FIGURE 13. Its rear end is provided with a generally horizontally disposed shelf 99 formed integrally on its upper side with a wedge-shaped pilot element 100 having a bore 101 for receiving a mounting cap screw (FIGURE 4) 102 threadedly engageable with a fixed supporting bracket 103 rigid with frame 75. Forward end 105 of anvil 98 is relatively thin and is provided with low-height upright lips 106 along its lateral edges which cooperate in holding seam parts 96, 96′ generally centered in mating position as will be explained more fully presently. It is also pointed out that the near face of wedge-shaped member 100 is provided with an outwardly opening shallow groove 108 (FIGURES 13 and 8) along which seam part 96 is guided while being advanced toward engagement with anvil face 109 and with mating seam part 96′.

Figure 4:
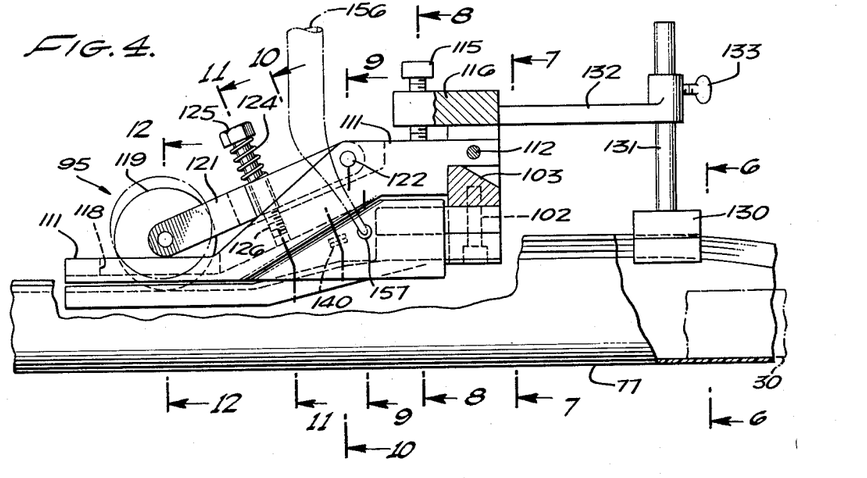
FIGURE 4 is a side elevational view on an enlarged scale of the seam closing assembly, parts being broken away and shown in section.

Cooperating with anvil 98 and wedge 100 in guiding seam parts 96, 96′ into mating position is an elongated shroud member 111 of inverted U-shaped in cross-section and pivotally supported at its rear end to stationary support 103 by a pivot pin 112 (FIGURES 4 and 9). The side skirts 113 of shroud 111 will be seen to be spaced closely to either side of lips 106 along either edge of anvil 98 in a manner holding seam parts 96, 96′ in position. Shroud 111 is held against excessive counterclockwise pivotal movement about pin 112 by an adjustable set screw 115 mounted in a stationary member 116 carried by frame 84 of sheathing assembly 83.

Figure 5:
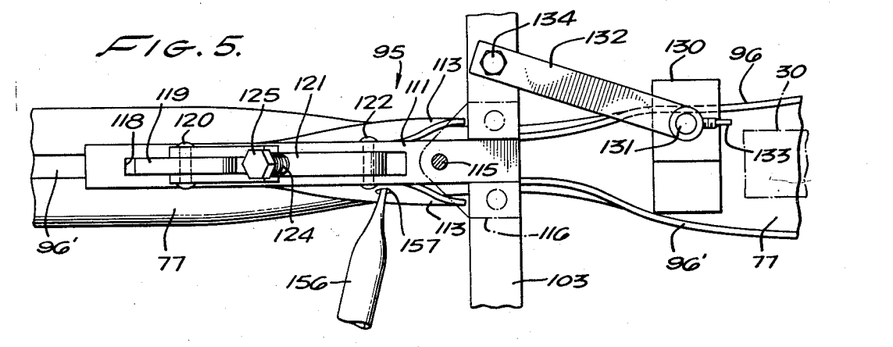
FIGURE 5 is a top plan view of FIGURE 4.

As is most clearly shown in FIGURES 4 and 5, the forward end shroud 111 is provided with an elongated vertically disposed slot 118 through which a pressing roller 119 has limited movement. Roller 119 is supported rotatably on a pin 120 mounted in the bifurcated end of a supporting arm 121 which arm is pivotally supported to a rear portion of shroud 111, as by a pivot pin 122. Arm 121 is urged to pivot counterclockwise through opening 118 by a coil spring 124 encircling an adjustable cap screw 125 having its lower end threaded into an opening 126 of shroud 111. It will be understood that roller 119 is urged by spring 124 against the upper surface of seam part 96′ in a manner to press seam parts 96, 96′ together as well as toward face 109 of anvil 98.

Figure 6:
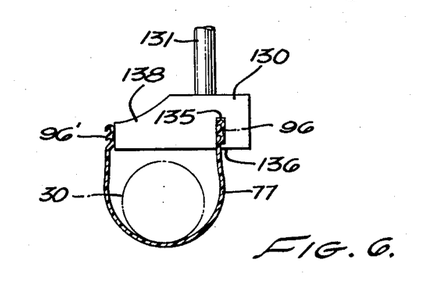
FIGURE 6 is a cross-sectional view taken along line 6—6 on FIGURE 4.

An important unit functioning to guide seam parts 96, 96′ into engagement comprises seam closure assembly 95. As shown in FIGURES 4, 5 and 6, this assembly includes a guide shoe member 130 fixed to the lower end of a supporting spindle 131 adjustably clamped to the outer end of a supporting arm 132 as by a thumb screw 133, arm 132 being secured to fixed member 103, as by a cap screw 134. Guide shoe 130 has a transverse slot 135 therethrough (FIGURE 6) having a restricted inlet 136, this slot and restriction being shaped to have a close sliding fit with seam part 96 and serving to hold this seam part in a predetermined position as it approaches the seam closure device 95. End wall 138 of guide shoe 130 provides a support for the mating seam parts 96′ and holds it spread apart in readiness to enter the laterally opening guide groove 108 of wedge 100 on anvil 98.

A further guide element of assistance in holding seam parts 96, 96′ spaced apart immediately prior to their closure is an inwardly projecting flange or shelf 140 (FIGURE 10) carried by a skirt 113 of shroud 111. This shelf is positioned to support seam part 96′ to hold it out of engagement with seam part 96 momentarily after application of the sealing agent and while the agent is spreading along the mating surfaces of part 96. This important function will be more readily understood after a description of the sealant feeding means.

To supply a regulated quantity of a fluent sealing agent to seal the seam parts permanently together there is provided a sealant feeding reservoir 150 (FIGURE 2) adjustably supported on an arm 151 carried by post 152 projecting upwardly from frame 75. Reservoir 150 is preferably provided with a transparent container having a feed control needle valve 155, the control end of which projects from its top and discharges the sealant slowly into a distributing tube 156. This tube preferably has a capillary passage at its lower end extending through an opening 157 (FIGURES 4 and 5) positioned to discharge onto a mating groove of seam part 96 in the manner made clear by FIGURE 9. It is important that the sealant agent be supplied in sufficient quantity for sealing purposes but without excess. The small capillary passage at the end of dispensing tube 156 and its light contact with the underlying seam part cooperate to this end in that movement of the underlying seam part 96 serves to withdraw sealant from the passage so long as advancing and effectively blocks flow for brief periods in cases where advance of the sheathing is stopped briefly for inspection or other purposes.

There remains to be mentioned the deeply grooved rollers 160 adjustably supported in part by frame 75 and in part by the sheathing assembly device 83 in the manner made clear by FIGURE 2. These rollers not only support cable 30 in its proper operating position relative to seam closing device 83, but additionally and importantly serve to wrap the sheathing upwardly about the opposite sides of the cable as it advances past seam closing anvil 98. Assisting rearmost roller 160 in guiding the longitudinally tensioned sheathing 77 into a snug fit about the lower and lateral sides of cable 30 is an eyebolt 168 (FIGURE 2) adjustably supported from a bracket 169 by means of a clamping screw 170. Eye 171 of bolt 168 encircles cable 30 substantially midway between rollers 81 and 160 and is so adjusted relative to bracket 169 as to bow the cable downwardly into the center of the tensioned sheath strip 77. This action aids materially in causing the lateral edges of the strip to fold upwardly about the cable as leading portions of these edges are advanced in precisely controlled paths into the mating relation of the seam parts in closure device 95.

Figure 3:
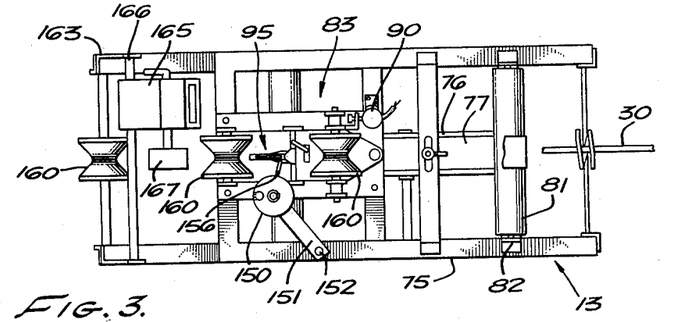
FIGURE 3 is a top plan view of the sheath assembling station as viewed in FIGURE 2.

Another feature of the sheathing assembly is the provision of a combined footage and automatic cut-off counter 165 (FIGURES 2 and 3). This device is slidably supported on a rod 166 mounted between a pair of arms 163 swingable about the supporting axle of roller 160. Footage counter 165 has a friction wheel 167 arranged to rest against the cable as it advances toward take-up reel 33. It is to be understood that counter 165 is a known commercial type readily pre-settable to trip an electric switch housed therein and that, when tripped, this switch operates to de-energize the entire apparatus.

The operation of the continuous cable assembling and sheathing apparatus 10 will be quite apparent from the foregoing detailed description of its principal components and subassemblies. To place the equipment in operation a preassembled core 35 of conductors coiled on a supply reel 36 is fed through hollow shaft 19 of the cable forming assembly 11 and toward take-up reel 33. Additional conductors 44 from individual supply reels 43 are then fed through the openings in the guide disc 69 and suitably secured or clamped in place about core 35.

Cable 30 is advanced under the control of the operator from control station 12, it being pointed out that this station is provided with a control box 175 for motor 16 and a second control box 176 for take-up drive motor 31. Each box is also provided with a starting button 177 and a stopping button 178.

The rotation of turntable 20 as viewed in FIGURE 1 is effective to apply a double layer of spirally arranged conductors about core 35 without actually twisting the conductors 44 about their own axes owing to the fact that the supply reels 43 for the conductors remain always horizontal in all rotary positions of turntable 20.

Cable 30 is advanced into sheathing assembly unit 13 while supported on the deeply grooved rollers 160 and on the underlying strip of sheathing 77 fed from supply reel 76. Rollers 160 are effective to mold sheathing 77 snugly against the lower and opposite sides of cable 30 and are aided in this respect by guide shoe 130, slot 135 of which embraces seam part 96 in the manner best shown in FIGURE 6. In this fashion seam parts 96 and 96′ are progressively guided into the seam closing assembly 83 and are there progressively brought into locking engagement in the manner clearly illustrated in FIGURES 7 to 12, and described in detail hereinabove. The closed and sealed sheathing issuing from the seam assembly unit 95 is compressed against the underlying enclosed cable 30 as it issues from unit 13 by the friction roller 167 pivotally supported above the assembled cable as this roller rotates to drive footage counter 165. When cabling of the length for which the counter has been set is assembled, the device functions to trip the switch therein thereby stopping the operation of the entire apparatus, or only of take-up reel motor 31 in the event the sheathing operation only is being carried out.

Cabling issuing from the sheath assembling device 13 will also be understood as passing through elongated oven 34 if sheath 77 is formed of heat reactive plastic as it desirably is. The constructional details of oven 34 are not of importance to this invention, any conventional type oven being satisfactory. The oven is sufficiently long as to fully activate the particular shrinkable plastic employed taking into account the rate of advance of the sheath and the temperature at which the oven should operate. An oven 10 to 15 feet in length housing infra red heat lamps is found to be quite adequate for use in heat shrinking sheathing having a body formed from Irvington Brand #3024 heat reactive vinyl material available from Minnesota Mining & Mfg. Co. The sheathing can be assembled quite loosely about the cable as the product passes past seam closure device 95 thereby greatly enhancing the smooth and trouble-free closure of the seam. Thereafter the passage of the sealed sheath through oven 34 serves to activate the sheath permanently shrinking it into a snug fit. An important aspect of this shrinkage operation is that the shrinkage progresses rearward along the sheath as shrunk portions advance onto the take-up reel. In consequence, lengthwise shrinkage is accommodated by relative slippage of partially shrunk portions of sheath and of the advancing cable. Hence the sheath will be understood as advancing at a slightly greater rate than the cable.

Should seam parts 96, 96' tend to jam for any reason in seam closing unit 95, an increased drag will be imposed immediately upon the pivotally supported frame 84 of unit 83, it being recalled that this unit is pivotally supported on pin 85 and spring biased counterclockwise as viewed in FIGURE 2 by spring 87. Any tendency to jam will result in unit 83 being pivoted counterclockwise in opposition to spring 87 thereby moving abutment 92 away from switch button 91 to actuate switch 90 and effect the cut off of power to driving motors 16 and 31.

It is further pointed out that the described cable forming and sheathing equipment is readily adaptable to the production of cables of widely varying sizes simply by varying the number of conductors being wrapped about the cable core and by making suitable adjustments of the many adjustable parts in the seam closing device 95 and in the sheath applying unit 83.

Figures 19, 21:
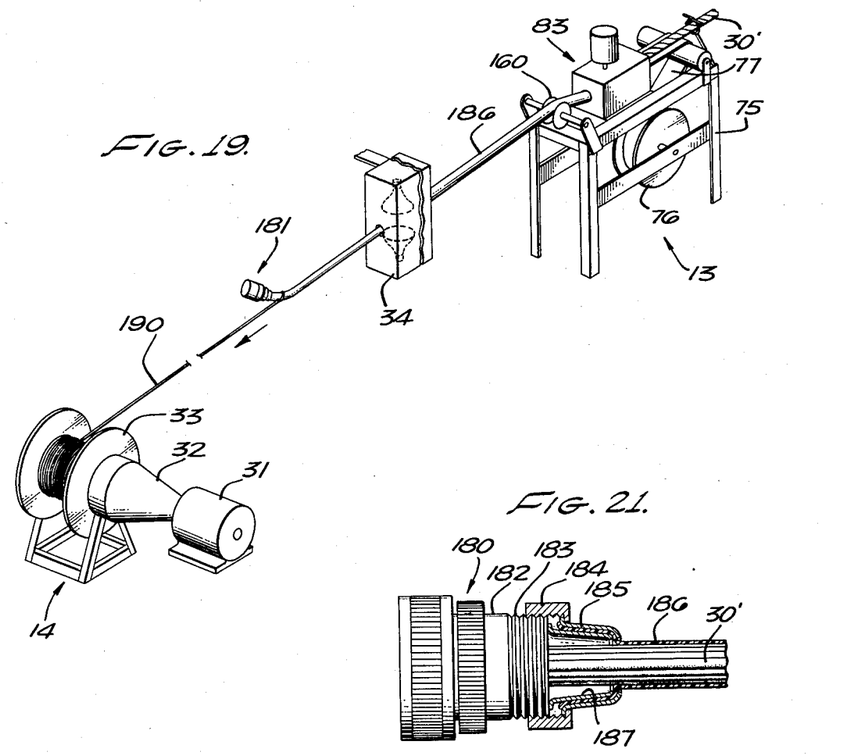
FIGURE 19 is a view in perspective showing the sheathing assembly in use to apply a heat shrinkable sheath to a bundle of conductors already connected at their opposite ends to cable head assemblies.
FIGURE 21 is an enlarged view partly in section of one of the cable heads showing the mode of sealing and anchoring the sheath to the cable head.
Figure 20:
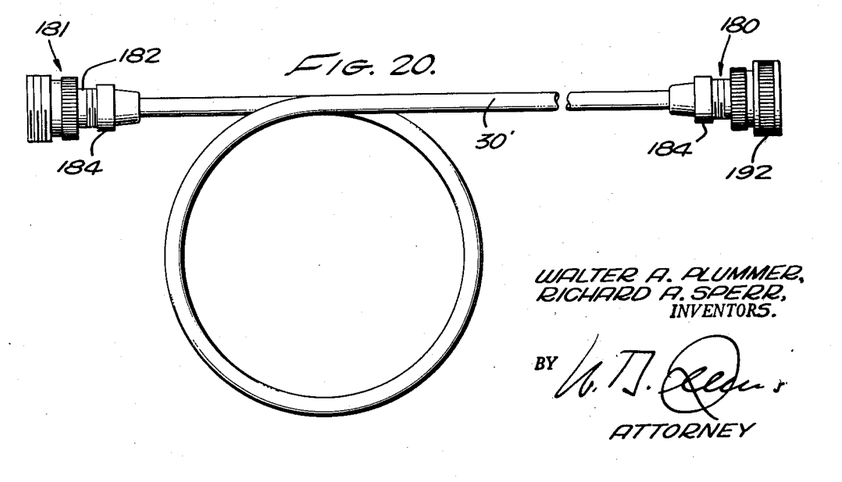
FIGURE 20 is a view of the completed cable after passing through the sheathing operation in progress in FIGURE 19.

Referring now more particularly to FIGURES 19 to 21, sheathing apparatus 13 and take-up assembly 14 will be observed in the process of assembling heat shrinkable sheathing 77 about a plurality of conductors after both ends of these conductors have been permanently assembled to the terminal pins of separate cable head assemblies, the female head being designated 180 and the male head 181. It will be understood these cable heads may be of any conventional type, that shown having a generally cylindrical body 182 and associated fittings of any suitable type. Main body 182 is provided interiorly thereof with insulating material accurately and rigidly seating terminal members soldered or otherwise electrically secured to the ends of the conductors. These terminals are provided with ends adapted to interfit or telescope into complementary shaped terminals of the other cable head. The inner end of main body 182 includes threads 183 mating with a threaded sleeve 184, the flange of which engages the outwardly flared base end of a frusto-conical anchorage sleeve 185 which is effective to draw the end of sheathing 186 into fluid-tight engagement with an inner smaller diameter frusto-conical member 187. As is made clear by FIGURE 21, tightening of clamping sleeve 184 compresses the end of sheath 186 against inner sleeve 187.

To fabricate the sheathed assembly, including cable heads 180 and 181, shown in FIGURE 20, the required equal-length individual conductors are first laid out in a straight line. The conductor ends are then soldered or otherwise electrically secured to the individual terminals of the cable heads and are thereafter assembled within cable heads 180 and 181, respectively, and subjected to rigid testing and checking for absolute accuracy in accordance with established procedures.

After it has been determined that all conductors are properly connected in their preselected oriented positions within the cable head, one cable head 181 is inserted through the sheath applying assembly 83 and operated to close plastic sheathing 77 about the conductors in the manner described in connection with FIGURES 1 to 18. The remote end of the cable may be suitably tensioned in any desired manner as by the use of capstan 27 and known tensioning techniques for advancing cable undergoing assembly. The heat shrinkable sheathing 77 is fitted about the cable and fed through the seam closure device 95 in the same manner described above. Sufficient excess sheathing is provided at forward cable head 181 to permit of its assembly over the inner anchorage sleeve 187. The outer sleeve 185 is then assembled and pulled into clamping position by the tightening of clamping sleeve 184. The end of the cable, assembled as just described, is then pulled through oven 34 and the heating lamps therein are employed to shrink the heat-reactive sheating 186 snugly about the closely compacted conductors. A suitable cable or cord 190 is attached to forward head 181 and secured to take-up reel 33 which is preferably positioned some distance from oven 34 and employed to pull the cable through sheathing device 13 and heat shrinking oven 34.

After the entire length of the conductors has been snugly enclosed by the sheath and the sheathing has been shrunk about the conductors, the terminal end of the sheath is securely anchored to rear cable head 180 in the same manner described in connection with head 181. Normally, heat shrinking of the trailing end of the sheathing is delayed until its clamping sleeve 184 has been securely tightened.

The finished product has the appearance shown in FIGURE 20 and the cable heads are then in readiness to be clamped to their mating receptacles. As herein shown, cable head 181 is threaded at the forward end of its main body to facilitate its securement to a threaded sleeve connector similar to sleeve 192 shown in place on cable head 180. However, it will be understood that these structural details of the cable head assemblies form no part of the present invention and may take various forms in accordance with the needs of a particular installation. The feature of importance here resides in the fact that the seamed heat shrinkable sheathing may be assembled to the conductors and anchored to the cable head after the latter has been preliminarily assembled and tested for accuracy of the conductor assemblies. Should it be found that any conductor is defective or improperly connected to a terminal, corrective action may be made before the sheathing is applied.

While the particular cabling machine and method of producing jacketed cabling herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. Apparatus for assembling and sheathing a multiple conductor cable without reliance on bonding agents between the sheathing and conductors with a prepared sheathing pretailored to fit the particular conductors undergoing assembly comprising, means for passing a plurality of conductors past a conductor assembling station to provide a cable of a desired size, means for passing an advance portion of the cable undergoing assembly past a sheathing station and there wrapping the same within a continuous flexible sheath having interlocking seam-forming means extending along the opposite lateral edges thereof, closure means having a plurality of relatively movable parts for progressively closing the interlocking portions of said seam-forming means together as said assembled cable is conducted past said sheathing station, and means for adjusting said relatively movable parts with respect to one another and for holding the same securely in different adjusted positions.

2. Apparatus as defined in claim 1 characterized in the provision of means automatically responsive to an abnormal operating condition at said means for closing said seam means to discontinue the operation of said apparatus pending correction of such abnormal operating condition.

3. Apparatus as defined in claim 2 characterized in that said abnormal condition responsive means includes adjustable spring biased means operable to actuate a cut-off switch when the tension in said seam means as it is advanced past said sheathing station exceeds a predetermined safe operating value.

4. Apparatus as defined in claim 1 characterized in the provision of means at said sheathing station for sealing said seam permanently closed as said seam means is closed.

5. Apparatus as defined in claim 1 characterized in the provision of means at said sheathing station for simultaneously engaging said interlocking seam means and for permanently sealing the same closed as said cable is advanced through said sheathing station.

6. Apparatus as defined in claim 1 characterized in that said sheathing station includes means for feeding flattened sheathing from a roll thereof and for closing the same about the assembled conductors of said cable as said sheath and cable are advanced simultaneously past said sheathing station.

7. Apparatus as defined in claim 1 characterized in the provision for a plurality of independent motors for driving different components of said apparatus, and separate controls for each of said motors which controls are grouped together at a single control station.

8. Apparatus as defined in claim 1 characterized in that said sheath is formed of heat reactive material which shrinks when heated, and means for heating said sheath following the closing of said seam means to shrink in the same snugly against the enclosed conductors.

9. Apparatus as defined in claim 1 characterized in that said sheath is formed of heat reactive shrinkable plastic material, means for heating said sheath as the sheath enclosed cable discharges from said seam closing means to shrink the sheath snugly against said conductors while the same are under predetermined tension.

10. Cable sheathing apparatus comprising means for advancing a multiple conductor cable past a sheathing station, means for advancing a continuous strip of flexible sheathing material having interlocking seam-forming means along the edges thereof past said station while folding the opposite edges thereof about said cable, seam-closing means for closing said seam means of said sheathing, said seam-closing means comprising an anvil member and cooperating guide and pressure members movably interconnected and positioned opposite the interior and exterior surfaces of said seam-forming means effective to press said seam means into interlocking engagement as the cable and sheathing is conducted past said sheathing station, and means for coiling the assembled sheathed cable on a handling spool for the cable as the same issues from said sheathing station.

11. Cable sheathing apparatus as defined in claim 10 characterized in the provision of means arranged co-axially of the cable as the cable advances toward said sheathing station for adding at least one spirally arranged layer of conductors to said cable as the same advances into said sheathing station.

12. Apparatus as defined in claim 11 characterized in being constructed and arranged to apply to said cable sheathing of the type having a main body of fluid impervious plastic material and further characterized in that said seam means comprises a pair of plastic tapes secured along the opposite edges of the main body of said sheathing which tapes are provided with at least one generally complementally shaped interfitting tongue and groove adapted to be forced into mating assembled relation as said sheath advances past said sheathing station.

13. Apparatus as defined in claim 12 characterized in the provision of means for applying a sealing agent to said tongue and groove prior to and as the same are advanced into interfitting relation at said sheathing station.

14. That method of making a continuous sheathed cable having a plurality of layers of oppositely spiraling conductors which method comprises advancing a cable core of spirally arranged conductors successively past a conductor assembly station and a cable sheathing station, continuously adding at least one other spiral layer of conductors to said core spiraling in a direction opposite to the direction of spiral of said core conductors, advancing a continuous flexible strip-like sheath lying generally parallel to the length of the cable being sheathed into intimate encircling engagement with the multiple layers of spiraling conductors, which sheath is provided along its opposite edges with interfitting seam means, and continuously closing said interfitting seam means as said cable is advanced past said sheathing station.

15. That method defined in claim 14 characterized in the step of applying a sealing agent to the contacting portions of said interfitting seam means prior to the closure of said seam means to seal the latter permanently closed in a fluid-tight manner.

16. That method defined in claim 14 characterized in the step of maintaining said cable under tension as the same is advanced past both said conductor applying station and past said sheathing station and of also maintaining said strip of sheath lightly tensioned lengthwise thereof as the same is advanced into encircling engagement about the assembled cable.

17. That method defined in claim 15 characterized in the step of pressing the interfitting portions of the closed seam means together under pressure to assure a strong sealed seam extending lengthwise of said cable and of said sheath as the assembled cable issues from said sheathing station.

18. That method defined in claim 15 characterized in that said sealing agent is applied to one edge only of said interfitting seam means.

19. That method of making a continuous sheathed cable having a plurality of layers of oppositely spiraling conductors which method comprises advancing a cable core of spirally arranged conductors successively past a conductor assembly station and a cable sheathing station, continuously adding at least one other spiral layer of conductors to said core spiraling in a direction opposite to the direction of spiral of said core conductors, advancing a continuous heat-shrinkable flexible strip of sheath material lying generally parallel to the length of cable being sheathed into encircling engagement with said layers of spiraling conductors, continuously interengaging the complementally grooved lateral edges of said sheath strip as the same advances, and passing said sheathed cable through a heated zone to shrink said sheath snugly about said conductors.

20. That method defined in claim 19 characterized in that the heat shrinking of said sheathed cable is performed closely adjacent the point where said grooved lateral edges of the sheath are brought together whereby additional sheathing required to compensate for lengthwise shrinkage of said sheath is provided for automatically by the relative slippage of the sheath with respect to the conductors as the sheathing advances at a rate slightly in excess of the rate of advance of said conductors.

21. Apparatus for continuously assembling a seamed tubular jacket about a cable as the cable is advanced therethrough, said apparatus including a driven take-up reel for coiling thereon jacketed cable issuing from said apparatus, a supply reel of continuous strip jacketing material having interlocking tongue and groove parts integral with the opposite lateral edges thereof, and means for wrapping said jacket about the advancing cable and for progressively shifting said tongue and groove parts into interlocking engagement, said last named means having a plurality of movably interconnected components openable and closeable relative to one another to facilitate insertion and removal of said tongue and groove parts at any point along the length of said tubular jacket while said jacket is being assembled to a cable.

22. Apparatus as defined in claim 21 characterized in the provision of feed control means for said jacket including means engageable with said tongue and groove parts and arranged to shift said parts progressively into proper alignment for interfitting engageable relation.

23. The seam closing device adapted for use in assembling continuous jacketing having interfitting slide fastener tapes integral with the opposite lateral edges thereof, said device comprising a long relatively thin broad anvil supported only at one end thereof, means for advancing a pair of complemental slide fastener tapes along the opposite sides of said anvil from the supported end thereof, means for feeding the free edges of said tapes progressively into mating relation with one another against one face of said anvil including cooperating means for applying pressure to force said tapes firmly into seating interlocking engagement as the assembled tapes are advanced beyond the unsupported end of said anvil.

24. A device as defined in claim 23 characterized in the provision of means for feeding a fluent sealing agent between the interengaging portions of said tapes immediately prior to the closure of said parts against one another, said sealing agent being effective to seal said assembled tapes permanently together.

25. A device as defined in claim 23 characterized in that the lateral edges of said anvil face have low-height flanges engageable with shoulders along the inner edges of the interlocking portions of said tapes and being cooperable therewith to hold said tape portions securely in place during the interlocking engagement thereof.

26. A device as defined in claim 23 characterized in that said means for applying pressure to force said tapes into interlocking engagement includes an adjustably supported roller rotatably mounted with its axis extending transversely of said anvil and closely spaced therefrom.

27. A device as defined in claim 23 characterized in the provision of spreader means adjustably supported in the path of the jacket as it approaches the supported end of said anvil, said spreader means being provided with a slot thereacross having a restricted entrance which entrance is shaped to engage behind a shoulder provided along the free edge of one of said tapes, and being cooperable therewith to hold said jacket in proper position for mating closure with the other of said tapes as these tapes come into mating registry adjacent the face of said anvil.

28. A device as defined in claim 27 characterized in that another portion of said spreader means is engageable with the other of said tapes and is spaced from said slot as to hold said tapes properly spaced apart for mating engagement opposite the face of said anvil.

29. A seam closing device for use in assembling continuous sheathing to a cable and the like comprising a main frame supporting a thin long anvil from one end thereof, said sheathing being of the type having secured along the edges thereof generally complementally shaped interfitting seam parts adapted to be momentarily distorted sufficiently for the interlocking assembly thereof, guide means formed to embrace said seam parts as said sheathing is advanced lengthwise of said anvil and including means for progressively advancing said seam parts into assembled relation while pressed against a face of said anvil, and roller means positioned to press said seam parts firmly together and against said anvil face.

30. A seam closing device for use in a machine for continuously assembling a seamed sheath to a cable as the cable is advanced past a sheathing station, said device comprising an elongated thin anvil arranged to be supported from one end thereof, said supported end including a wedge-shaped member having one face thereof secured to a flange overlying and spaced to lie in a different plane than the face of the anvil at the non-supported end thereof, means for advancing the complementally shaped interlocking edges of a split sheath lengthwise past said anvil, means for guiding one sheath edge past one of the converging faces of said wedge-shaped member and along one face of said anvil, and other means for guiding the other sheath edge past the other converging face of said wedge-shaped member and into assembled position with said first mentioned sheath edge while the latter is being advanced along said anvil face.

31. A device as defined in claim 30 characterized in the provision of means for simultaneously advancing sheathing and an object to be enclosed therewithin past said anvil and including means responsive to an abnormal strain on said device operable automatically to discontinue the operation of said sheath advancing means.

32. A device as defined in claim 30 characterized in the provision of measuring means including a friction roller bearing against the said cable and operable thereby to measure the length of cable sheathed by said device and operable to discontinue the operation of said means for advancing cable therepast when a predetermined length thereof has been assembled.

33. A device as defined in claim 30 characterized in the provision of a roller having its rim facing said anvil and operable to press said sheath edges together against said anvil as said edges are advanced therepast.

34. Flexible strip plastic sheath of heat reactive plastic material having a pronounced shrink characteristic when heated, said plastic strip having continuous complementally shaped interfitting parts extending along its opposite lateral edge portions engageable with one another to form a strong fluid-tight seam, said strip being adapted for assembly into tubular form about cables, conduits and the like in loose fitting form and being thereafter contractable into snug fitting form by subjecting the assembled strip to heat to shrink the same.

35. That method of enclosing an elongated object in a snug fitting tubular sheath of flexible plastic material which method comprises, providing an elongated strip of sheathing of flexible heat reactive plastic material having a high shrinkage factor when heated, and having interengaging complementally shaped tongue and groove seam forming means along its opposite edges, wrapping said sheath loosely about the object to be enclosed, closing said seam forming parts together to form a loose fitting sheath about the object, and thereafter heating said sheath to contract the same snugly about the object being sheathed.

36. A tubular protective sheath having a longitudinal seam extending therealong, said sheath comprising an elongated strip of flexible heat reactive plastic material characterized by its pronounced shrinkage factor upon being heated, said strip having complementally shaped interfitting tongue and groove means formed along its opposite lateral edges engageable to form a tube having a fluid-tight seam, said sheath being adapted to be assembled loosely about an object to be sheathed and being thereafter shrinkable into snug fitting contact with the object by subjecting said closed sheath to heat.

37. That method of constructing a sheathed cable which comprises providing a plurality of electrically insulated conductors lying generally parallel to one another and of substantially equal lengths, connecting the ends of said conductors to predetermined terminals of cable heads, checking the assembled conductors and cable heads for accuracy and sufficiency, and thereafter enclosing said assembled conductors in a fluid-tight sheath of strip plastic material having a seam extending longitudinally from end-to-end thereof.

38. That method defined in claim 37 characterized in that said assembled conductors and said sheath are advanced under tension past a sheath assembly station as said strip sheathing is progressively wrapped about said conductors and the seam thereof is progressively closed.

39. That method defined in claim 37 characterized in the use of heat reactive plastic material for said sheath and further characterized in subjecting the sheathed cable to heat to shrink the same snugly about the enclosed conductors.

40. Cable sheathing apparatus comprising means for advancing a multiple conductor cable past a sheathing station, means for advancing a continuous strip of flexible sheathing material having interlocking seam forming means along the edges thereof past said station while folding the opposite edges thereof about said cable, and closure means for closing said seam means of said sheathing into interlocking engagement, said closure means comprising a pair of elongated members extending lengthwise of and positioned opposite the inner and outer surfaces of said seam-forming means, and means on said closure means permitting said seam-forming means to be inserted into and removed from said closure means at any time and at any point along the length of a cable undergoing sheathing.

References Cited in the file of this patent

UNITED STATES PATENTS

| | | |
|---|---|---|
| 1,173,190 | Hoopes | Feb. 29, 1916 |
| 2,389,725 | Gillis et al. | Nov. 27, 1945 |
| 2,454,625 | Bondon | Nov. 23, 1948 |
| 2,756,172 | Kidd | July 24, 1956 |
| 2,941,027 | Suec | June 14, 1960 |